United States Patent Office 3,781,359
Patented Dec. 25, 1973

3,781,359
PRODUCTION OF 2-HYDROXY-3,5,6-
TRICHLOROBENZYLAMINES
David I. Randall, and Joseph P. Copes, Easton, Pa.,
assignors to GAF Corporation, New York, N.Y.
No Drawing. Filed Apr. 23, 1970, Ser. No. 31,364
Int Cl. C07c 87/28
U.S. Cl. 260—570.9    2 Claims

ABSTRACT OF THE DISCLOSURE

The invention describes 2-hydroxy-3,5,6-trichlorobenzylamines, having the formula:

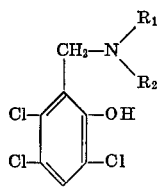

Where $R_1$ and $R_2$ may each be hydrogen, hydrocarbon groups, substituted hydrocarbon groups or taken together with the nitrogen atom, form a heterocyclic ring, and salts thereof; and novel methods for their synthesis.

They are useful as buffering agents, lubricating oil additives and chemical intermediates and appear to affect enzyme systems.

THE INVENTION

This invention relates to the class of compounds having the formula:

(I)

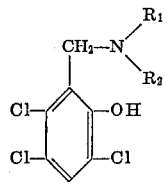

Where $R_1$ and $R_2$ may each be hydrogen, hydrocarbon groups, substituted hydrocarbon groups or when taken together with the nitrogen atom form a heterocyclic ring, and salts thereof as follows:

Representative groups for $R_1$ and $R_2$ include hydrogen or the following:

(a) Alkyl groups and substituted alkyl groups of 1 to about 18 carbon atoms, either straight or branched chained, e.g. methyl, ethyl, n-propyl, isopropyl, n-butyl, isobutyl, n-pentyl, n-hexyl, nonyl, decyl, dodecyl, and the like.

(b) Cycloalkyl groups of 3 to about 8 carbon atoms such as cyclopropyl, cyclobutyl, cyclopentyl, cyclohexyl, cycloheptyl and cyclooctyl;

(c) Aryl groups and substituted aryl groups of about 6 to about 15 carbon atoms, e.g. phenyl, o-, m- and p-xylyl, tolyl, phenyl substituted by one or more alkyl groups of 1 to 3 carbon atoms or other groups such as chloro or nitro, 1-naphthyl, 2-naphthyl and the like;

(d) Aralkyl groups such as benzyl, phenethyl and the like; and (e) Wherein

represents a residue of basic secondary amines such as dialkylamines, such as dimethylamine, diethylamine, etc. and heterocyclic groups formed from $R_1$ and $R_2$ together with the nitrogen atom to which they are attached; including alkyl-substituted derivatives thereof where the alkyl group has from 1 to about 5 carbons; including aziridine, pyrrolidinone, pyrrolidine, morpholine, piperidine, and the like.

This invention also relates to the preparation of such compounds starting with the reaction of 2,4,5-trichlorophenol with formamides or N-monoalkylformamides plus formaldehyde and its precursors as indicated below.

Compounds of this invention are characterized by a polyfunctional amphoteric nature shown by reactive positions at both the amine and phenolic moieties. These participate in various reactions including, at the phenolic moiety, ester and ether formation as well as salt formation, acylation reactions with substituted benzene sulfonyl chlorides as well as oxidation. The amine moiety can of course participate in all of the reactions common to such moieties. The compounds of this invention possess utilities as chemical intermediates and particularly, since they can be condensed with certain anthraquinone dye intermediates, as dyestuff intermediates for dyes which are substantive to synthetic fibers. Further, the compounds of this invention affect various enzyme systems and have uses, directly or via further synthesis, as agriculture chemicals and as pharmaceuticals and pharmaceutical intermediates.

PREFERRED EMBODIMENTS OF THE INVENTION

The invention relates to the novel products of the above formula and to novel methods for their preparation.

The synthesis is carried out according to the following reactions for producing primary or secondary amines of the types (a), (b), (c) and (d).

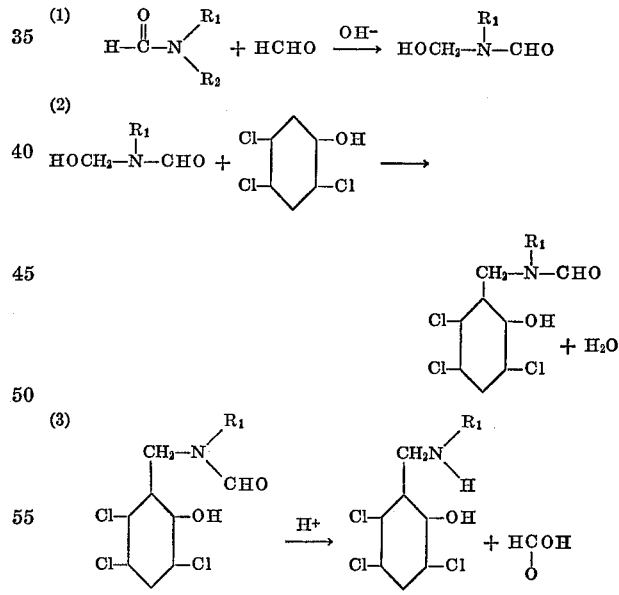

The presently preferred procedure by which these compounds of the above formula are produced is by reacting formaldehyde (or formaldehyde-producing precursers such as paraformaldehyde) in situ with formamide or N-monosubstituted formamides of the formula:

(II)

$$H-\overset{O}{\underset{}{C}}-\overset{H}{\underset{}{N}}-R_1$$

where $R_1$ is described above in (a), (b), (c) or (d) (see Equation 1). This is followed by addition of the 2,4,5-trichlorphenol in acid soltuion (see Equation 2.) The reactants are employed in essentially equimolar quantities although a range of amide to aldehyde to phenol of 1–1.5:1–3.5:1 respectively is not precluded. Acidic conditions are necessary. The temperature may range from —5° C. to +50° C. during reaction. When all additions are complete, the system is refluxed, 1–6 hours, with added water to complete the reaction (see Equation 3). The yields will run from about 60–90% of the theoretical. A variation of this reaction, comprising the gradual addition of the formaldehyde (or precurser) to a solution of the phenol and the above-described formamide provides even better yields.

The product of this procedure will be the acid salt of the amine and the free amine may be regenerated by bringing the aqueous solution to a pH in the range of 7.5 using a suitable base such as sodium hydroxide.

It is presently preferred to form the compounds represented by (e) above as well as those where neither $R_1$ or $R_2$ represent hydrogen through the elimination of ammonia in the reaction between the corresponding diamine or cyclic amine and 2-hydroxy-3,5,6-trichlorobenzyl amine as exemplified in Equation 4. This reaction proceeds smoothly between room temperature and about 150° C. In this process the amine serves as the basic catalyst for the reaction.

While any N-monosubstituted formamide described by the formula at (II) may be utilized in the process, the most preferred group of amide reactants are N-methylformamde, N-ethylformamide. The N-heterocyclic derivatives are preferably prepared as set forth in Examples IV and V below. This synthesis is carried out according to reaction 4 using the product of Example 1 and a secondary amine by the following method for producing the desired tertiary amines, including cyclic N-heteroamines of (e) using as intermediate the free amine product of reaction (3) where $R_1$ is hydrogen:

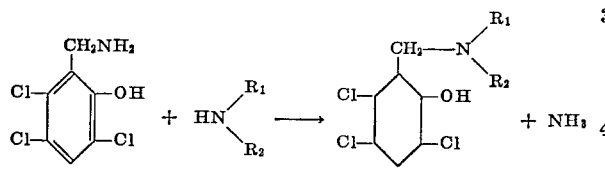

As pointed out, certain of these compounds have an effect on enzyme systems and 2-hydroxy-3,5,6-trichlorobenzylamine (Example I below) has been found to exhibit diuretic effects when experimentally administered to dogs. The exact nature of the physiological systems involved has not been clarified.

Generally the compounds of this invention, due to their amphoteric nature have great pH stability in aqueous and similar systems and are thus useful as buffering agents in both chemical and physiological systems.

In addition to internally associated property, these compounds also possess intramolecular association and are therefore useful for altering the viscosity of a variety of liquids. As a result of the effect of the compounds of this invention upon the viscosity of liquids they are particularly useful as additives to lubricating oils. Furthermore, they are also substantive to metals and consequently increase the lubricity of lubricating oil compositions under extreme pressures. Their use is also advantageous in such compositions as the molecule per se contains no metals and thus these additives leave no ash upon ignition.

As a class, the compounds have good stability at high temperatures and thus are useful modifiers of physical properties of liquids for use in situations of unusually high temperatures and stress such as in oil-well drilling compositions and within internal combustion engines.

The details of the preparation of several representative compounds of the general class encompassed by this invention are disclosed in the following examples. The examples particularly describe preferred methods for synthesizing the particular compounds. The invention has been described with reference to certain preferred embodiments cited in the examples below. However, the invention is not to be limited to these specific embodiments as all equivalents to the general classes of components, moieties and compounds described above are intended to be encompassed within this invention. This intended equivalents and variations upon the herein described methods and compositions should be obvious to those skilled in these arts.

EXAMPLE I 2-hydroxy-3,5,6-trichlorobenzylamine 197.4 grams (1 gram mol) of 2,4,5-trichlorophenol is reacted, dissolved in 360 grams 100% sulfuric acid, at room temperature with a 10% excess, 86 g., of the N-methylol formamide (N-hydroxymethylformamide) prepared by reacting 35 grams of paraformaldehyde with 49½ grams of formamide in the presence of 1 gram of sodium hydroxide as catalyst. The reaction proceeds via an α formamido-3,4,6-trichloro-o-cresol mechanism. This intermediate can be isolated at this stage. While dilution with water and refluxing results in the sulfate salt of the instant compound, a preferred embodiment consists in the actual isolation of the intermediate and hydrolyses as follows:

The reaction mixture is drowned in ice whereupon precipitation of the above formamido compound occurs. This precipitate is washed with water, and is then readily hydrolyzed with 2 liters of constant boiling aqueous hydrogen chloride, (20%) to afford the hydrochloride of the instant compound. Adjusting the pH to 7.5 with aqueous sodium hydroxide solution yields the subject compound as the free amine in 70% yield as a sparsely water-soluble, off-white solid (M.P. 192–195). As the sodium salt, this exhibited infrared absorption bands at 3410, 1630, 1587, and 870 and 742μ among others.

EXAMPLE II 32.4 grams (0.55 mol) of N-methylformamide were mixed with
15.8 grams (0.5 mol) of 95% paraformaldehyde. A trace,
2 pellets of sodium hydroxide were added and slight warming was applied. The mixture became clear. This represents the N-methyl-N-methylol formamide. This was then added in small increments with cooling to a solution of
99 grams (0.5 mol) of 2,4,5-trichlorophenol dissolved in
950 grams of 100% sulfuric acid. The resulting material was then drowned in
3 liters of crushed ice. The resulting whitish precipitate was washed with water by decantation, filtered and dried, and represents the intermediate N-(2-hydroxy-3,5,6-trichlorobenzyl) N-methyl formamide. This was further refluxed for 3 hours with
1 liter of 15% aqueous hydrochloric acid at 109°. This was then filtered and brought to a pH of 7.8 with 20% aqueous sodium hydroxide which caused the precipitation of N-methyl - 2 - hydroxy - 3,5,6 - trichlorobenzyl amine; 60 grams dry weight which was found to melt at 180–182° C.

EXAMPLE III

The procedure of Example II is repeated but using an equivalent molar amount of N-ethylformamide instead of the methyl formamide. The product N-ethyl-2-hydroxy-3,5,6-trichlorobenzylamine is obtained.

EXAMPLE IV 17 grams of 2-hydroxy - 3,5,6 - trichlorobenzylamine (from Example I) were refluxed with 100 ml. morpholine for 8 hours at about 128° C. During this time, ammonia gas evolved from the system. The product was then allowed to cool and 150 ml. of water were added. An oil separated which soon crystallized. A portion of this was recrystallized from ethanol and found to melt at 120–122° C., and represented the product α-morpholino-3,4,6- trichloro-o-cresol or N-(2-hydroxy-3,5,6-trichloro-benzyl morpholine. Calculated for $C_{11}H_{12}Cl_3NO_2$: N, 4.7%; Cl, 35.9%; found N, 4.55%, Cl, 35.7%.

EXAMPLE V 17 grams of 2-hydroxy - 3,5,6 - trichlorobenzylamine (from Example I) were placed in an autoclave with 100 ml. diethylamine for 8 hours at about 150° C. The product was isolated by evaporation of the low boilers and crystallization of the residue twice from ethanol yielded: N,N-diethyl - 2 - hydroxy-3,5,6-trichlorobenzylamine of the formula:

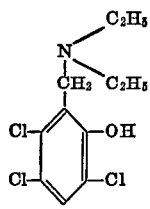

What is claimed is:
1. A method for the production of amine compounds having the formula:

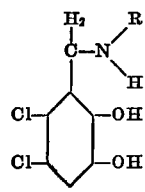

wherein R is selected from the group consisting of hydrogen, methyl or ethyl, said method comprising:
(a) reacting a compound having the formula

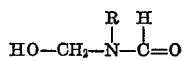

wherein R is hydrogen, methyl or ethyl, with 2,4,5-trichlorophenol in an acidic medium at a reaction temperature within the range of from about —5° C. to about +50° C., and
(b) hydrolyzing the resulting amido-intermediate in an acidic medium to form the amine compound as the acid salt thereof.

2. The method of claim 1 in which said amine is 2-hydroxy-3,5,6-trichlorobenzylamine.

References Cited
UNITED STATES PATENTS
3,399,226   8/1968   Saari _____ 260—570.9

OTHER REFERENCES
A. Cohen et al.: Chemical Abstracts, vol. 52, p. 7311 (1958).
A. Chwala: Chemical Abstracts, vol. 43, p. 569 (1949).
Ross et al.: J. Org. Chemistry, vol. 31, Jan.–Mar., pp. 133–137 (1966).

ALEX MAZEL, Primary Examiner
J. TOVAR, Assistant Examiner

U.S. Cl. X.R.
260—239 E, 247.7 C, 293.84